United States Patent [19]
Inabata

[11] Patent Number: 4,941,012
[45] Date of Patent: Jul. 10, 1990

[54] FINDER OPTICAL SYSTEM FOR CAMERAS

[75] Inventor: Tatsuo Inabata, Kunitachi, Japan

[73] Assignee: Olympus Optical Co., Ltd., Tokyo, Japan

[21] Appl. No.: 309,295

[22] Filed: Feb. 13, 1989

[30] Foreign Application Priority Data

Feb. 17, 1988 [JP] Japan .................................. 63-32868

[51] Int. Cl.$^5$ .............................................. G03B 7/097
[52] U.S. Cl. ...................................... 354/478; 354/155
[58] Field of Search ............... 354/476, 478, 479, 155, 354/219, 224, 225

[56] References Cited

U.S. PATENT DOCUMENTS

| | | | |
|---|---|---|---|
| 3,465,660 | 7/1969 | Trankner et al. | 354/478 |
| 4,171,888 | 10/1979 | Shono et al. | 354/155 |
| 4,494,853 | 1/1985 | Watanabe | 354/478 |

FOREIGN PATENT DOCUMENTS

| | | |
|---|---|---|
| 39-31452 | 10/1964 | Japan . |
| 48-43377 | 12/1973 | Japan . |
| 48-43378 | 12/1973 | Japan . |
| 58-38116 | 3/1983 | Japan . |
| 58-62337 | 4/1983 | Japan . |

Primary Examiner—Russell E. Adams
Attorney, Agent, or Firm—Cushman, Darby & Cushman

[57] ABSTRACT

A finder optical system for cameras comprises a Porro prism, a mirror assembly, or a compound assembly of a mirror and a prism which includes four reflecting surfaces for erecting an image formed through an imaging optical system and which can take out light for photometry from one of the reflecting surfaces. The finder optical system can bring about always constant photometric distribution without the increase of components in number, can make the correction of parallax to be required, and can be manufactured in small size and at low cost.

22 Claims, 6 Drawing Sheets

REFLECTION AREA (OR TRANSMISSION AREA)

REFLECTION AREA (OR TRANSMISSION AREA)

REFLECTION AREA (OR TRANSMISSION AREA)

45° 4TH REFLECTION PLANE

FINDER OPTICAL SYSTEM FOR CAMERAS

BACKGROUND OF THE INVENTION

1. Field of the Invention

The present invention relates to a finder optical system peculariarly suitable for lens shutter type photographic cameras, video cameras, electronic cameras, etc.

2. Description of the prior art:

In general, as a finder optical system for lens shutter type photographic cameras, video cameras, electronic cameras, etc., an optical system of any of an albada type, inverse Galileo type and Kepler type (real image mode) is often used. In the past, a photometric optical system for exposure control in the use of such a finder optical system has been provided as a separate optical system, independently of a finder optical system and a photographing optical system.

Where the photometric optical system is independent of the finder optical system and the photographing optical system, as mentioned above, in order that when a photographing lens is arranged as a zoom lens or as a lens system capable of being selectively switched over to plural different focal lengths, an angle of view of light incident on the photometric optical system is changed in accordance with the variation of the angle of view caused by the zooming or the switchcover to different focal lengths, it is necessary to move a light receiving element for photometry and provide newly the zoom lens or the focal length switchable lens system as the photometric optical system. As a result, there has been problems that this arrangement brings about the increase of parts in number and is contrary to intentions of diminishing the size and reducing the cost of the camera.

Further, since optical axes of the photographing optical system and the photometric optical system are different from each other, it is necessary for the optical system to be provided with a parallax correction mechanism for the two optical axes to maintain an exact range of photometry with respect to an object located between and infinitely far position and the nearest position. This also defeats the aims of the compaction and cost reduction of the camera.

SUMMARY OF THE INVENTION

It is therefore a primary object of the present invention to provide a finder optical system for cameras constructed so that an angle of view of light incident on a photometric optical system is changed in accordance with the variation of the angle of view of a photographing lens without the increase of components in number, thereby holding always constantly a ratio of a photometric range to a visual field to be photographed, and the correction of parallax to be required can be made.

Another object of the present invention is to enable the above finder optical system to be manufactured in diminished size and at low cost.

These object are achieved, according to the present invention, by an arrangement such that, in a real image mode finder in which an objective optical system and an eyepiece optical system are provided and an image of an object to be photographed, formed through the objective optical system is observed through an eyepiece, an assembly of prisms or mirrors for erecting an inverted image obtained by the objective optical system is provided in an optical path of a finder and light for photometry is taken out of the assembly.

According to the finder optical system of the present invention, the objective optical system and part of the prism or mirror assembly of the finder optical system are also used as components of the photometric optical system for conducting the light to a light receiving element for photometry, thereby making it possible to manufacture the camera in small size and at low cost. The prism is configured as a Porro prism.

These and other objects as well as the features and advantages of the present invention will become apparent from the following detailed description of the preferred embodiments when taken in conjunction with the accompanying drawings.

DESCRIPTION OF THE PREFERRED EMBODIMENTS

Figure 1:
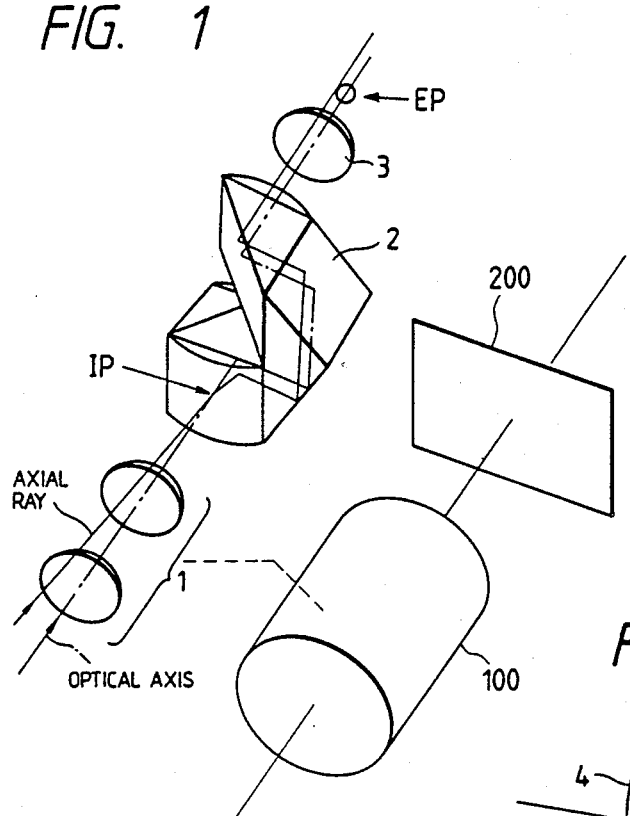
FIG. 1 is a general perspective view of the first embodiment of a finder optical system according to the present invention.

In accordance with the embodiment shown in the drawings, the present invention will be described in detail below.

In FIG. 1, reference numeral 1 represents an objective lens unit of a finder optical system, 2 a second class Porro prism exhibiting the behavior that an image formed through the objective lens unit 1 is inverted vertically and horizontally to be erected, and 3 an eyepiece. Further, reference numeral 100 represents a photographing lens and 200 a film. The finder optical system and a photographing optical system are juxtaposed so that their optical axes are substantially parallel with each other. Here, the photographing lens 100 is a varifocal lens and the objective lens unit 1 of the finder optical system is constructed so that its focal length can be changed in accordance with the variation of that of the photographing lens as shown in numerical data examples described later. Accordingly, when an angle of view of the photographing lens is varied, that of the objective lens unit 1 is also changed in accordance therewith.

Figure 2:
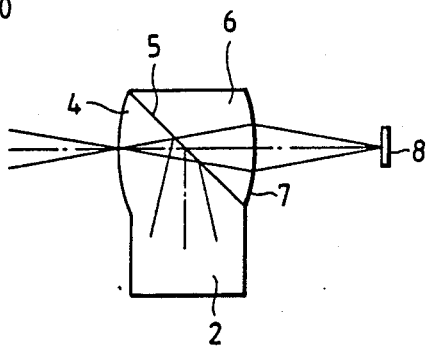
FIG. 2 is a plan view of a Porro prism whose second reflecting surface and subsequent reflecting surfaces are omitted, of the first embodiment.

A beam of light coming from an object to be photographed through the objective lens unit 1 forms an image of the object to be photographed in the vicinity (an intermediate imaging position IP) of a plane of incidence of the Porro prism 2, is incident on the Porro prism 2, is reflected form a first reflecting surface which is a semi-transmissive reflecting surface, is further reflected from second to fourth reflecting surfaces in succession before emanating from the Porro prism 2, and traverses the eyepiece 3 to be incident on an eye of an eye point EP for observation, and these components constitute a real image mode finder optical system of a Kepler type. FIG. 2 is a plan view of the Porro prism 2 whose second reflecting surface and subsequent reflecting surfaces are omitted. Reference numeral 4 represents the plane of incidence which is also an intermediate imaging surface, having a lens function, 5 the first reflecting surface, 6 a prism for photometry cemented to the first reflecting surface, 7 a plane of exit behaving also as an imaging lens of the prism for photometry, and 8 a light receiving element for photometry disposed in an imaging position of the plane of exit 7, which are arranged so that the light beam transmitted by the first reflecting surface 5 is incident on the prism for photometry 6 and is imaged on the light receiving element for photometry 8 by an imaging function of the plane of exit 7 for execution of photometry.

Figure 3:
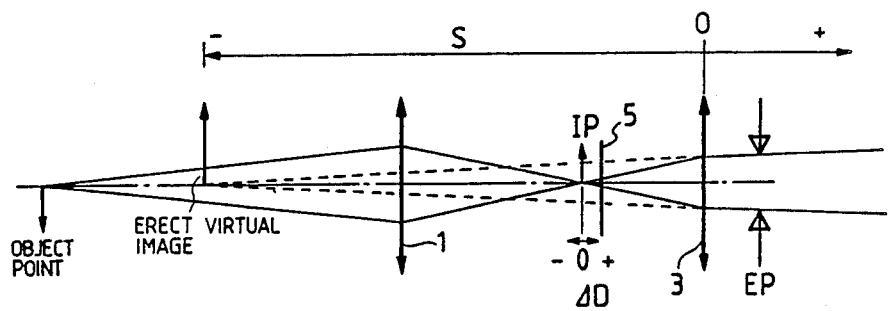
FIG. 3 is a view showing diagrammatically the optical system of the first embodiment.
Figure 4A:
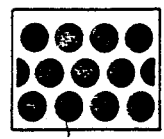
FIGS. 4A to 4C are views showing various examples of pattern mirrors used for a first reflecting surface of the first embodiment.
Figure 4B:
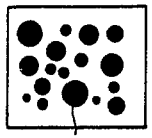
Figure 4C:

Also, the first reflecting surface 5 is composed of a half mirror comprising a derivative film formed by $ZrO_2$, SiO, $SiO_2$, $TiO_2$, etc. or a metal film formed by Al, Cr, etc. which is coated thereon, or a pattern mirror surface comprising a metal film formed by Al, Ag, etc. which is coated on its entire surface so that reflection areas with reflectivity as high as more than 80% and transmission areas are distributed at a proper rate of area and in arbitrary shapes as shown in FIGS. 4A, 4B and 4C to split incident light at a given rate into reflection light and transmission light. Here, in the case where the pattern mirror surface is used, when the diopter of the finder is represented by S, the optical path length from the intermediate imaging position to the pattern mirror by $\Delta D$, and the focal length of an eyepiece system by f as shown in FIG. 3, it is necessary to satisfy the following conditions:

$$S - \left(\frac{1000}{f^2}\right)\Delta D < -15 \text{ (diopter)}$$

or $$S - \left(\frac{1000}{f^2}\right)\Delta D > 5 \text{ (diopter)}$$

If these conditions are not satisfied, an image in a visual field system cannot clearly be observed since the position of the pattern mirror approaches to a least distance of distinct vision and the shapes of patterns will directly be viewed.

Further, in the pattern mirror, if only the reflection areas and the transmission areas are arrayed so as to be in a constant rate, the reflection areas and the transmission areas with the same shapes may be arrayed so that pitch spaces between the centers of gravity of individual areas are equal to each other as depicted in FIG. 4A, and alternatively the reflection areas and the transmission areas with various shapes, as shown in FIGS. 4B and 4C, may be arrayed so that the spaces between the centers of gravity of individual areas are irregular.

Although the description has been given of the construction of a first embodiment as in the foregoing, this embodiment employs in common the objective lens unit 1 and part of the Porro prism 2 included in the finder optical system as a photometric optical system, so that if zooming of a photographing optical system is set to coincide with the angle of view of the finder optical system, photometric distribution with an always constant rate of a photometric range in a photographing visual field can be attained by automatically changing the angle of view of the light incident on the light receiving element for photometry in accordance with the variation of the angle of view caused by the zooming and changeover to plural focal lengths in the photographing optical system and, if parallax between the photographing optical system and the finder optical system is corrected, the correction of parallax between the photographing optical system and the photometric optical system is unnecessary. Because it is, therefore, not required to provide newly a zoom optical system or a focal length changeover optical system and a parallax correction mechanism as the photometric optical system, the number of parts is not increased and a small sized and inexpensive finder optical system is available.

Figure 5:
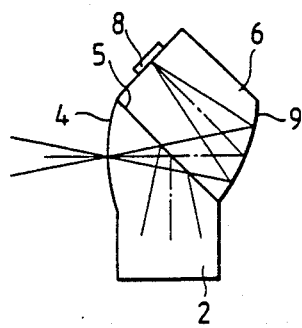
FIGS. 5 to 16 are views showing essential parts of Porro prisims of second to thirteenth embodiments, respectively.

FIG. 5 shows a second embodiment, which is adapted to form the light passing through the first reflecting surface as an image on the light receiving element for photometry 8 by a concave reflecting surface 9 with refractive power. The concave reflecting surface 9 may be configured in such a manner that a metal film formed by Al and the like is applied on its backside and that total reflection is utilized.

Figure 6:
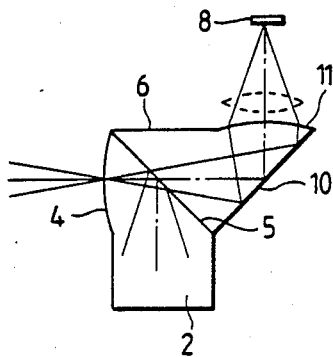

FIG. 6 depicts a third embodiment, which is adapted to form the image on the light receiving element for photometry 8 by using at least one mirror surface 10 making use of a matel reflection film or a total reflection surface and at least one imaging lens 11 provided on an exit end face of the prism. The imaging lens 11 on the exit end face may be configured as a component separated from the photometric prism 6 as indicated with a dotted line.

Figure 7:
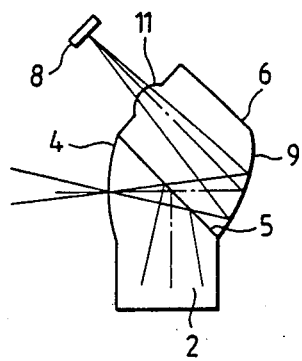

FIG. 7 shows a fourth embodiment, which is designed so that the concave reflecting surface 9 and the imaging lens 11 are both used for at least each one to form the image.

Also, in each of the embodiments mentioned above, the light beam entering the light receiving element for photometry is limited to rays in a relatively narrow range close to the optical axis and as such, if at least one surface of the imaging lens is made aspherical, spherical aberration is favorably corrected and imaging performance of the photometric optical system is considerably improved. Further, it is not always necessary for the lens or mirror to be a lens or mirror with a continuous surface, and a Fresnel lens or a mirror with a Fresnel lens-shaped reflecting surface may also be used. In such an instance, space can be diminished for a portion corresponding to the thickness of the lens.

Figure 8:
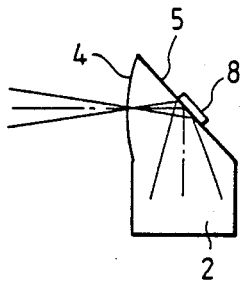
Figure 9:
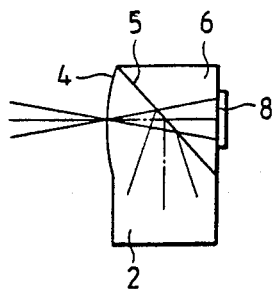

Also, the photometric optical system need not always be necessary to be constructed as imaging optical system, so that the light receiving element for photometry 8 for spot photometry may be cemented directly to the first reflecting surface 5 like a fifth embodiment depicted in FIG. 8 and the light receiving element for photometry 8 for mean photometry may be located on the plane of exit of the photometric prism 6 with no power or in the vicinity thereof like a sixth embodiment shown in FIG. 9. However, where light is taken out of a surface on which total reflection occurs like other surfaces of the Porro prism 2, it is desirable that the light receiving element for photometry 8 is cemented to such a surface to prevent the total reflection caused by the existence of an air space.

Figure 10:
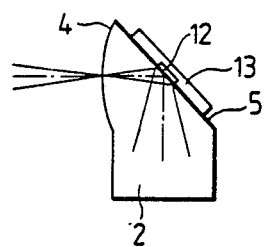
Figure 11A:
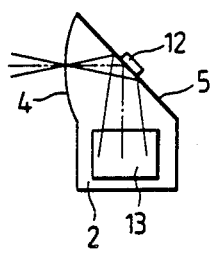
Figure 11B:
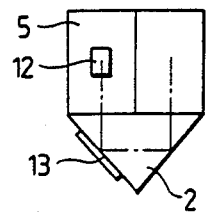

Further, for example, where a light receiving element for spot photometry and a light receiving element for mean photometry are separately provided, as in a seventh embodiment depicted in FIG. 10, a plurality of light receiving elements for photometry (a light receiving element for spot photometry 12 and a light receiving element for mean photometry 13) and a compound type light receiving element for photometry may well be arranged on one reflecting surface. In addition, like an eighth embodiment shown in FIGS. 11A and 11B, two or more light receiving elements of photometry 12, 13 may also be separately disposed on two or more reflecting surfaces.

Figure 12:
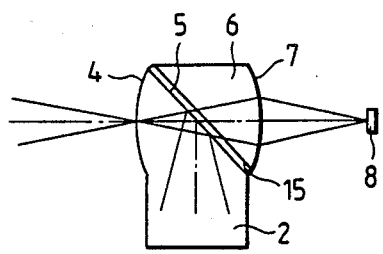

FIG. 12 illustrates a ninth embodiment, in which at least one coated plate-shaped optical component 15 is cemented between the Porro prism 2 and the photometric prism 6 to form the first reflecting surface 5. As such, a coated member is arranged separate from the prism 2, thereby enabling materials with characteristics adapted for functions to be selectively used in such a manner that materials whose residual photoelastic strain and birefringence are small as in, for example, PMMA are employed for the prism 2 and, on the other hand, materials which are excellent in heat resistance and advantageous to coating conditions like, for example, glass and polycarbonate are used for a member on which coating is applied, and serving to enhance the entire optical performance of the finder optical system.

The above description has been given of the case where the light beam for photometry is taken out of the first reflecting surface 5 for the sake of convenience and, even if the same is performed on any of the second to fourth reflecting surfaces, such problems as mentioned above can be solved.

Figure 13:
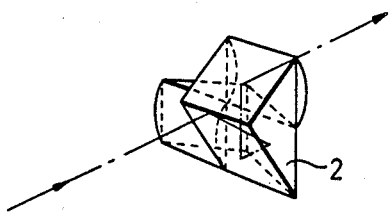
Figure 14:
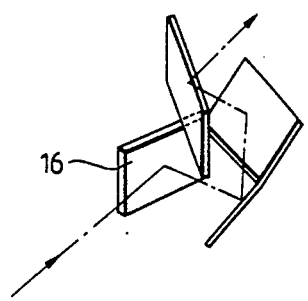
Figure 15:
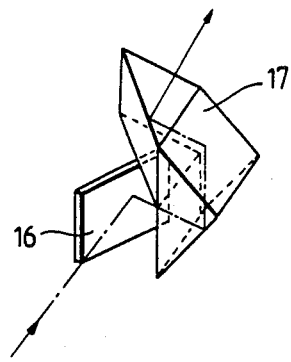

Also, in a vertical and horizontal inversion optical system of a type consisting of a first class Porro prism 2 like a tenth embodiment depicted in FIG. 13, a type that mirrors 16 are arranged in the same configuration as the reflecting surfaces of the Porro prism like an eleventh embodiment shown in FIG. 14, or a type that the mirror 16 and a prism 17 are jointly used like a twelfth embodiment shown in FIG. 15, the use of the same measure makes it possible to solve the problems.

Further, even in the case where the first reflecting surface 5 of the Porro prism 2 is arranged not only in the vicinity of the intermediate imaging position of the objective optical system, but also inside the objective optical system or the eyepiece optical system, the problems can be solved by the same measure.

Figure 16:
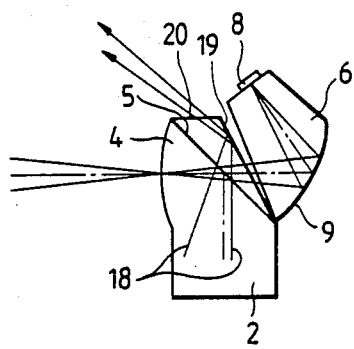
Figure 17:
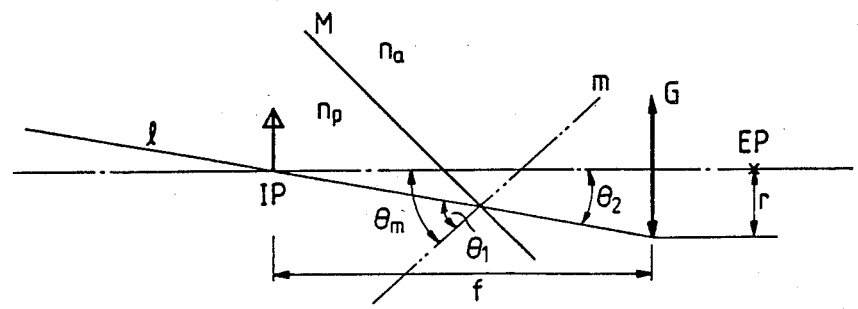
FIGS. 17 and 18 are views showing diagrammatically essential parts of the optical system of the thirteenth embodiment.

Although, in the second and fifth embodiments, light of inverse incidence entering from the eye point side transmitted by the first reflecting surface to be incident on the light receiving element for photometry 8 and sometimes adversely affects accuracy of photometry, as in a thirteenth embodiment shown in FIG. 16 for such a case, when a prism 20 for preventing the inverse incidence which has an air space interface 19 making such an angle that total reflection is not generated for the light beam from the object passing through the first reflective surface of the Porro prism 2 and conversely it is generated for light of inverse incidence 18 is provided between the Porro prism 2 and the photometric prism 6 and is cemented on the side of the Porro prism 2, the light of inverse incidence 18 can be intercepted. Referring now to FIG. 17, this respect will be explained.

FIG. 17 is a view shown diagrammatically by extending linearly the distance from an intermediate imaging position IP to an eye point EP. When an interface M separating two media with refractive indices $n_p$ and $n_a$ lies between the intermediate imaging position IP and the eye point EP and an angle made by a nomal m of the interface M with a low marginal ray 1 having the smallest angel made by the interface M among rays passing through a pupil diameter is represented by $\theta_1$, the condition that the low marginal ray 1 coming from the objective lens side is not totally reflected is given by $$\theta_1 < \sin^{-1}\left(\frac{n_a}{n_p}\right) \quad (1)$$

Here, when the focal length of an eyepiece G is represented by f, a pupil radius at the eye point EP by r, an angle of inclination made by the normal m with the optical axis by $\theta_m$, and an angle made by the low marginal ray 1 with the optical axis by $\theta_2$, the following formula is obtained:

$$\theta_1 = \theta_m + \theta_2 = \theta_m + \tan^{-1}\left(\frac{r}{f}\right) \quad (2)$$

However, the finder optical system in this case assumes an afocal system in which the low marginal ray 1 at the eye point EP is parallel with the optical axis. Therefore, from conditions (1) and (2)

$$\theta_m + \tan^{-1}\left(\frac{r}{f}\right) < \sin^{-1}\left(\frac{n_a}{n_p}\right) \quad (3)$$

$$\therefore \theta_m < \sin^{-1}\left(\frac{n_a}{n_p}\right) - \tan^{-1}\left(\frac{r}{f}\right)$$

If $n_a=1$, $n_p=1.5$, $r=2$ and $f=20$ as general values, $\theta_m < 36.1°$.

Figure 18:
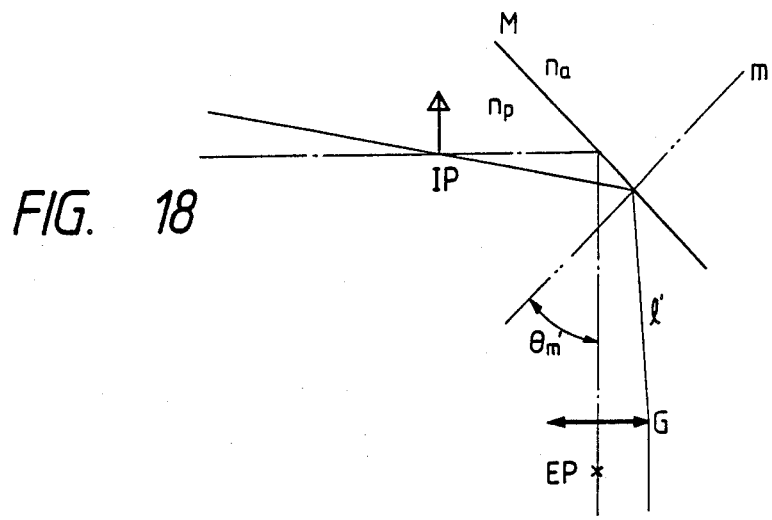

In contrast to this, with respect to light of inverse incidence 1' entering from the eye point EP by following at least the same optical path as in the low marginal ray 1 as depicted in FIG. 18 (a view shown diagrammatically by extending linearly the optical path in the Porro prism from the intermediate imaging position IP to the eye point EP as a reflecting optical system), an angle of inclination $\theta_m'$ made by the normal m of the interface M with the optical axis of the light of inverse incidence 1' is expressed by $\theta_m' = 90° - \theta_m$. The condition that the total reflection occurs from the interface M in relation to the light of inverse incidence 1' is given by $$\theta_m' > \sin^{-1}\left(\frac{n_a}{n_p}\right) - \tan^{-1}\left(\frac{r}{f}\right) \quad (4)$$

Although it is therefore necessary only to select the angle of inclination of the interface 19 so that conditions (3) and (4) are simultaneously satisfied, the angle of inclination $\theta_m'$ is less than 45° in general and as such, if the interface M is set so that condition (3) is satisfied, condition (4) is naturally satisfied.

Figure 19:
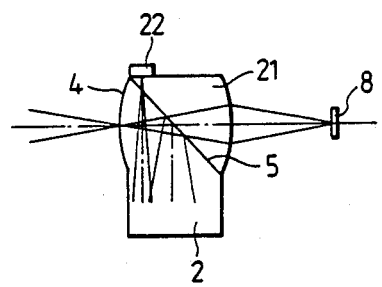
FIGS. 19 to 21 are views showing essential parts of Porro prisms of fourteenth to sixteenth embodiments, respectively.
Figure 20:
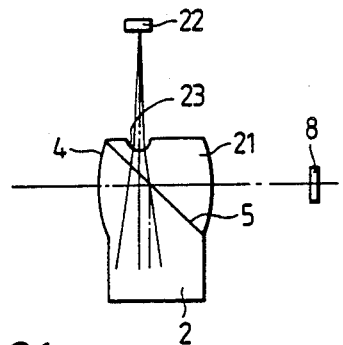
Figure 21:
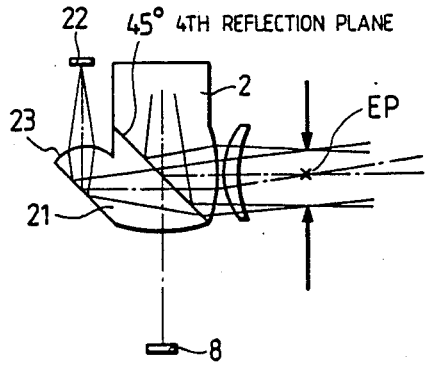

The photometric prism can also be used as a finder indication optical system prism. For instance, a light emitting member for indication 22 is arranged at a position conjugate with the intermediate imaging position IP of the objective lens unit 1 in FIG. 1, that is, on the upper surface of a prism for photometry and indication 21 whose optical path length coincides in view of the refractive indices of the Porro prism 2 and the prism for photometry and indication 21 as a fourteenth embodiment shown in FIG. 19. Further, like a fifteenth embodiment depicted in FIG. 20, at least one spherical or aspherial lens portion having power or Fresnel lens portion 23 is provided on the upper surface and thereby a position where the light emitting member 22 is place may arbitrarily be changed. Also, like a sixteenth embodiment shown in FIG. 21, at least one total reflection mirror, mirror or mirror lens coated with the metal film and the like, or Fresnel mirror lens may be placed at a position other than the reflecting surfaces of the Porro prism 2 in the midway of the optical system for indication to bend arbitrarily the optical path so that the light emitting member 22 is arranged at a position conjugate with the intermediate imaging position IP. Moreover, similar to the case of the photometric optical system, a light beam for indication may well be conducted from any of the first to fourth reflecting surfaces of the Porro prism 2.

Next, numerical data examples will be shown in the following.

Numerical data example I

Figure 22:
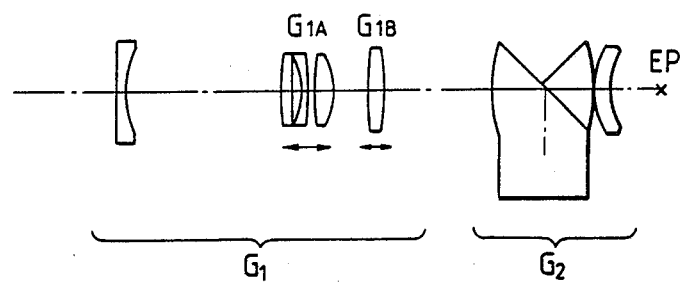
FIGS. 22 and 23 are views showing arrangements in numerical date example 1.
Figure 23:
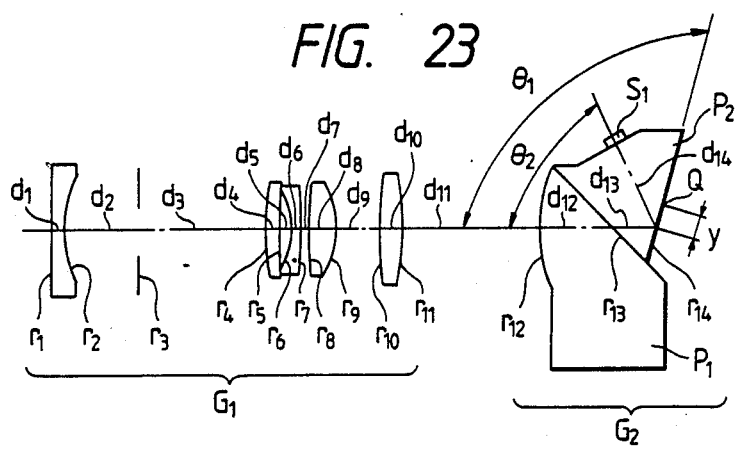

This example uses part of the finder optical system consisting of an objective optical system $G_1$ and eyepiece optical system $G_2$ in common with the photometric optical system as shown in FIG. 22. As depicted in FIG. 23, the light beam traversing the objective optical system $G_1$ of surfaces $r_1 \sim r_{11}$ to be imaged at the top surface position of a surface $r_{12}$ is incident on the entrance end face $r_{12}$ of the eyepiece optical system $G_2$, passes through a first reflecting surface $r_{13}$ of a Porro prism $P_1$ which is coated with a half mirror, and is reflected from a Frensel lens-shaped reflecting surface $r_{14}$ of a photometric prism $P_2$ which is a reflection metal mirror coated on the backside and whose center of rotation Q is eccentric by a distance y in the direction of an angle $\theta_1$ on a meridonal plane. The reflecting surface $r_{14}$ is inclined by the angle $\theta_1$ with respect to a finder optical axis of incidence and causes reflected light to be imaged again on a light receiving element for photometry $S_1$ located in the position inclined by an angle $\theta_2$ to the finder optical axis of incidence. The intention of forming the image of an object on the surface $r_{12}$ is to dispose a field stop at this position to clear the outline of a visual field and, if such is not required, it is favorable that the image is formed at a position separate from the surface $r_{12}$ so that dirt is not viewed together with the image.

Also, the Porro prism $P_1$ and the photometric prism $P_2$ are cemented to each other at the surface $r_{13}$.

$f_1 = 12.549 \sim 32.00$ $r_1 = -193.9146$
$d_1 = 1.5593$     $n_1 = 1.49216$  $\nu_1 = 57.50$
$r_2 = 19.5937$
$d_2 = 13.499$
$r_3 = \infty$ (aperture stop)
$d_3 = 10.854$ -continued $f_1 = 12.549 \sim 32.00$ $r_4 = 26.9942$
$d_4 = 2.0006$     $n_2 = 1.72916$  $\nu_2 = 54.68$
$r_5 = -70.3255$
$d_5 = 1.2097$
$r_6 = -13.2007$
$d_6 = 1.3403$     $n_3 = 1.80518$  $\nu_3 = 25.43$
$r_7 = -56.3597$
$d_7 = 1.0002$
$r_8 = 60.6809$
$d_8 = 3.0002$     $n_4 = 1.49216$  $\nu_4 = 57.50$
$r_9 = -11.1119$ (aspherical surface)
$d_9 = 6.156$
$r_{10} = 188.4302$
$d_{10} = 2.4997$     $n_5 = 1.49216$  $\nu_5 = 57.50$
$r_{11} = -27.1673$ (aspherical surface)
$d_{11} = 16.88$
$r_{12} = 22.6270$
$d_{12} = 6.68$     $n_6 = 1.49216$  $\nu_6 = 57.50$
$r_{13} = \infty$ (coated surface)
$d_{13} = 7.07$     $n_7 = 1.49216$  $\nu_7 = 57.50$
$r_{14} = -7.54824$ (Fresnel lens-shaped reflection surface)
$d_{14} = 8$     $n_8 = 1.49216$  $\nu_8 = 57.50$
$r_{15} = \infty$ (imaging surface)
Aspherical surface coefficients
$E_9 = 0.99485 \times 10^{-4}$,    $F_9 = -0.27888 \times 10^{-6}$,
$G_9 = 0.91165 \times 10^{-8}$,
$E_{11} = 0.30403 \times 10^{-4}$,    $F_{11} = 0.83713 \times 10^{-6}$,
$G_{11} = 0.47674 \times 10^{-7}$,    $H_{11} = 0.78973 \times 10^{-8}$,
$E_{14} = 0.726383 \times 10^{-3}$,    $F_{14} 32\ 0.114783 \times 10^{-4}$,
$G_{14} = 0.563304 \times 10^{31\ 6}$,    $H_{14} = 0.814138 \times 10^{-8}$,
$y = 2.504$
$\theta_1 = 105°$
$\theta_2 = 64°$
Frensel lens with infinitely small pitch
Aperture stop diameter     5.502 mm
Angle of view of incidence     52.85°

Numerical data example II

Figure 24:
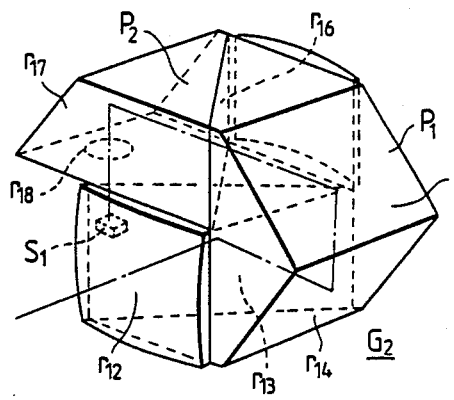
FIGS. 24 and 25 are a perspective view of an eyepiece optical system and a view of optical paths viewed from an eye point, respectively, in numerical data example 2.
Figure 25:
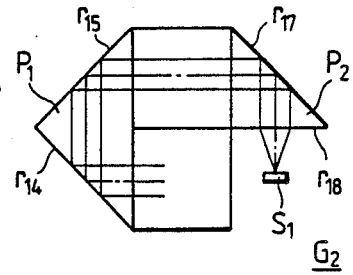

This example also uses part of the finder optical system consisting of the objective optical system $G_1$ and the eyepiece optical system $G_2$ in common with the photometric optical system as shown in FIG. 22. Although the numerical data of the objective optical system $G_1$ is the same as the numerical data example 1, that of the eyepiece optical system $G_2$ is different from the example 1. The light beam transversing the objective optical system of the surfaces $r_1 \sim r_{11}$ to be imaged at the top surface position of the surface $r_{12}$ in FIG. 23 like the case of the numerical data example 1 enters from the entrance end face $r_{12}$ of the eyepiece optical system $G_2$, as depicted in FIG. 24, is totally reflected in succession from the first reflecting surface $r_{13}$, the second reflecting surface $r_{14}$ and the third reflecting surface $r_{15}$ of the Porro prism $P_1$, and passes through the fourth reflecting surface $r_{16}$ of the Porro prism $P_1$ which is coated with a half mirror to be incident on the photometric prism $P_2$. The behavior of the prism to the fourth reflecting surface $r_{16}$ is used in common with the photometric optical system. The light beam passing through the fourth reflecting surface $r_{16}$ is totally reflected from a fifth reflecting surface $r_{17}$ of 45° reflection bending the optical axis by 90° and is condensed by a transmissive aspherical Fresnel condenser lens $r_{18}$ to be imaged again on the light receiving element for photometry $S_1$. Also, the Porro prism $P_1$ and the photometric prism $P_2$ are cemented to each other at the surface $r_{16}$. FIG. 25 is a view showing the optical path in the case of viewing the eyepiece optical system $G_2$ from the eye point EP on the rear side of the fourth reflecting surface $r_{16}$.

$$f_1 = 12.549 \sim 32.00$$

| | | |
|---|---|---|
| $r_1 = -193.9146$ | | |
| $d_1 = 1.5593$ | $n_1 = 1.49216$ | $\nu_1 = 57.50$ |
| $r_2 = 19.5937$ | | |
| $d_2 = 13.499$ | | |
| $r_3 = \infty$ (aperture stop) | | |
| $d_3 = 10.854$ | | |
| $r_4 = 26.9942$ | | |
| $d_4 = 2.0006$ | $n_2 = 1.72916$ | $\nu_2 = 54.68$ |
| $r_5 = -70.3255$ | | |
| $d_5 = 1.2097$ | | |
| $r_6 = -13.2007$ | | |
| $d_6 = 1.3403$ | $n_3 = 1.80518$ | $\nu_3 = 25.43$ |
| $r_7 = -56.3597$ | | |
| $d_7 = 1.0002$ | | |
| $r_8 = 60.6809$ | | |
| $d_8 = 3.0002$ | $n_4 = 1.49216$ | $\nu_4 = 57.50$ |
| $r_9 = -11.1119$ (aspherical surface) | | |
| $d_9 = 6.156$ | | |
| $r_{10} = 188.4302$ | | |
| $d_{10} = 2.4997$ | $n_5 = 1.49216$ | $\nu_5 = 57.50$ |
| $r_{11} = -27.1673$ (aspherical surface) | | |
| $d_{11} = 16.88$ | | |
| $r_{12} = 22.6270$ | | |
| $d_{12} = 7.35$ | $n_6 = 1.49216$ | $\nu_6 = 57.50$ |
| $r_{13} = \infty$ (first reflection surface) | | |
| $d_{13} = 9.9$ | $n_7 = 1.49216$ | $\nu_7 = 57.50$ |
| $r_{14} = \infty$ (second reflection surface) | | |
| $d_{14} = 9.5$ | $n_8 = 1.49216$ | $\nu_8 = 57.50$ |
| $r_{15} = \infty$ (third reflection surface) | | |
| $d_{15} = 10.35$ | $n_9 = 1.49216$ | $\nu_9 = 57.50$ |
| $r_{16} = \infty$ (fourth reflection surface) | | |
| $d_{16} = 9.25$ | $n_{10} = 1.49216$ | $\nu_{10} = 57.50$ |
| $r_{17} = -3.5998$ | | |
| $d_{17} = 3.0$ | | |
| $r_{18} = \infty$ (imaging element surface) | | |

Aspherical surface coefficients
$E_9 = 0.99485 \times 10^{-4}$, $F_9 = -0.27888 \times 10^{-6}$,
$G_9 = 0.91165 \times 10^{-8}$,
$E_{11} = 0.30403 \times 10^{-4}$, $F_{11} = 0.83713 \times 10^{31.6}$,
$G_{11} = -0.47674 \times 10^{-7}$, $H_{11} = 0.78973 \times 10^{-9}$,
$E_{17} = 0.564614 \times 10^{-2}$, $F_{17} = -0.471486 \times 10^{-3}$,
$G_{17} = 0.501271 \times 10^{-4}$ Frensnel lens with infinitely small pitch
Aperture stop diameter 5.502 mm
Angle of view of incidence 52.85°

In each of the numerical data examples, reference symbol $r_i$ represents the radius of curvature of the i-th surface, $d_i$ the distance between the i-th surface and the (i+1)-th surface, and $n_j$ and $\nu_j$ the refractive index and Abbe's number of the j-th lens or prism, respectively. Also, when the optical axis is taken as the x axis and the axis passing through the top of the aspherical surface and perpendicular to the optical axis as the y axis, the aspherical surface used in each example is expressed by $$x = \frac{Y^2/R}{1 + \sqrt{1 - (Y/R)^2}} + By^2 + Ey^2 + Fy^6 + Gy^8 + Hy^{10} + \ldots$$

where reference symbol R represents the paraxial radius of curvature of the aspherical surface and B, E, F, . . . the aspherical surface coefficients of the second power, fourth power, sixth power, . . . , respectively. Of the numerical data examples, as an instance, $F_9$ designates the aspherical surface coefficient of the sixth power of the ninth surface. Also, each embodiment is constructed so that lens groups $G_{1A}$, $G_{1B}$ are moved along the optical axis in accordance with the variable power of the photographing lens, as shown in FIG. 22, and thereby the magnification of the finder is changed.

What is claimed is:

1. A finder optical system for cameras comprising:
an objective lens,
a Porro prism having a plurality of reflecting surfaces to erect an image of an object formed by the objective lens,
an eyepiece for observing the object image,
one of the reflecting surfaces of said Porro prism having properties of transmitting a part of light incident on said one of the reflecting surfaces and reflecting the remainder and
a light receiving element for photometry provided at a position where the light transmitted through said one of the reflecting surfaces can be received.

2. A finder optical system according to claim 1, wherein a plane of incidence of said Porro prism is configured to retain a lens function and said optical system further comprises a prism for photometry cemented to a reflection surface which transmits the part of light and reflects the remainder and having a plane of exit configured as an imaging lens for conducting the light transmitted through said reflection surface to said light receiving element for photometry to form an image thereon.

3. A finder optical system according to claim 2, wherein said reflecting surface is constructed as a pattern mirror splitting light of incidence at a predetermined rate into reflection light and transmission light.

4. A finder optical system according to claim 1, wherein a plane of incidence of said Porro prism is configured to retain a lens function and said optical system further comprises a prism for photometry cemented to a first reflection surface which transmits the part of light and reflects the remainder and having a second reflection surface with refracting power for reflecting the light transmitted through said first reflection surface to form an image on said light receiving element for photometry placed on one surface thereof.

5. A finder optical system according to claim 1, wherein a plane of incidence of said Porro prism is configured to retain a lens function and said optical system further comprises a prism for photometry cemented to a reflection surface which transmits the part of light and reflects the remainder and having a mirror surface for reflecting at least once the light transmitted through said reflection surface and a plane of exit configured as an imaging lens for imaging the light reflected from said mirror surface on said light receiving element for photometry.

6. A finder optical system according to claim 1, wherein a plane of incidence of said Porro prism is configured to retain a lens function and said optical system further comprises a prism for photometry cemented to a first reflection surface which transmits the part of light and reflects the remainder and having a second reflection surface with refracting power for reflecting the light transmitted through said first reflection surface and a lens surface for imaging the light reflected from said second reflection surface on said light receiving element for photometry.

7. A finder optical system according to claim 3 or 6, wherein said plane of exit is configured as an aspherical surface.

8. A finder optical system according to claim 7, wherein a light emitting member for indication in a visual field of a finder is provided on a surface other than the plane of exit of said prism for photometry.

9. A finder optical system according to claim 7, wherein a lens surface for introducing light for indication into a visual field of a finder is configured on a surface other than the plane of exit of said prism for photometry.

10. A finder optical system according to claim 5, wherein said second reflection surface is configured as an aspherical surface.

11. A finder optical system according to claim 6, wherein at least one of said second reflection surface and said lens surface is configured as an aspherical surface.

12. A finder optical system according to claim 1, wherein a plane of incidence of said Porro prism is configured to retain a lens function and said optical system further comprises a light receiving element for spot photometry cemented to a reflection surface which transmits the part of light and reflects the remainder and receiving the light transmitted through said reflection surface.

13. A finder optical system according to claim 1, wherein a plane of incidence of said Porro prism is configured to retain a lens function and said optical system further comprises a prism for photometry cemented to a reflection surface which transmits the part of light and reflects the remainder and having a flat plane of exit provided with a light receiving element for mean photometry receiving the light transmitted through said reflection surface.

14. A finder optical system according to claim 1, wherein a plane of incidence of said Porro prism is configured to retain a lens function and said optical system further comprises a light receiving element for spot photometry and a light receiving element for mean photometry cemented to a reflection surface which transmits the part of light and reflects the remainder and receiving the light transmitted through said reflection surface.

15. A finder optical system according to claim 1, wherein a plane of incidence of said Porro prism is configured to retain a lens function and said optical system further comprises a light receiving element for spot photometry cemented to a reflection surface which transmits the part of light and reflects the remainder and receiving the light transmitted through said reflection surface and a light receiving element for mean photometry cemented to one surface of said Porro prism to receive the light reflected from said reflection surface.

16. A finder optical system according to claim 1, wherein a plane in incidence of said Porro prism is configured to retain a lens function and said optical system further comprises at least one plate-shaped optical member cemented to a reflection surface which transmits the part of light and reflects the remainder and applied with coating capable of transmitting the light transmitted through said reflection surface and a prism for photometry cemented to said optical member and having a plane exit configured as an imaging lens for conducting the light transmitted through said optical member to said light receiving element for photometry to form an image thereon.

17. A finder optical system according to claim 1, wherein a plane of incidence of said Porro prism is configured to retain a lens function and said optical system further comprises a prism for inverse incidence prevention cemented to a first reflection surface which transmits the part of light and reflects the remainder and constructed so as to transmit the light from an object, transmitted through said first reflection surface and to totally reflect light of inverse incidence from an eyepoint side, transmitted through said first reflection surface and a prism for photometry arranged adjacent to said prism for inverse incidence prevention through an air space and having a second reflecton surface with refracting power for reflecting the light from the object, transmitted through said first reflection surface to form an image on said light receiving element for photometry placed on one surface thereof.

18. A finder optical system according to claim 3, wherein a light emitting member for indication in a visual field of a finder is provided on a surface other than the plane of exit of said prism for photometry.

19. A finder optical system according to claim 3, wherein a lens surface for introducing light for indication into a visual field of a finder is configured on a surface other than the plane of exit of said prism for photometry.

20. A finder optical system for cameras comprising:
an objective lens,
four mirrors combined with each other to erect an image of an object formed by the objective lens,
an eyepiece for observing the object image,
one reflecting surface of said four mirrors having properties of transmitting a part of light incident on said one of the reflecting surfaces and reflecting the remainder, and
a light receiving element for photometry provided at a position where the light transmitted through said one of the reflecting surfaces can be received.

21. A finder optical system for cameras comprising:
an objective lens,
a mirror and a prism combined with each other to erect an image of an object formed by the objective lens,
an eyepiece for observing the object image,
one reflecting surface of said mirror and reflecting surfaces of said prism having properties of transmitting a part of light incident on said one of the reflecting surfaces and reflecting the remainder, and
a light receiving element for photometry provided at a position where the light transmitted through said one of the reflecting surfaces can be received.

22. An imaging device provided with a finder optical system for cameras comprising:
an objective lens,
an optical means having a plurality of reflecting surfaces to erect an image of an object formed by the objective lens,
an eyepiece for observing the object image,
a photographing optical system disposed independently of the finder optical system, wherein one of the reflecting surfaces of said optical means has properties of transmitting a part of light incident on said one reflecting surface and reflecting the remainder, and
a light receiving element for photometry provided at a position where the light transmitted through said one of the reflecting surfaces can be received.

* * * * *